Oct. 12, 1943.     W. A. ARNESEN     2,331,591
RETINOSCOPE
Filed Sept. 14, 1940     2 Sheets-Sheet 1
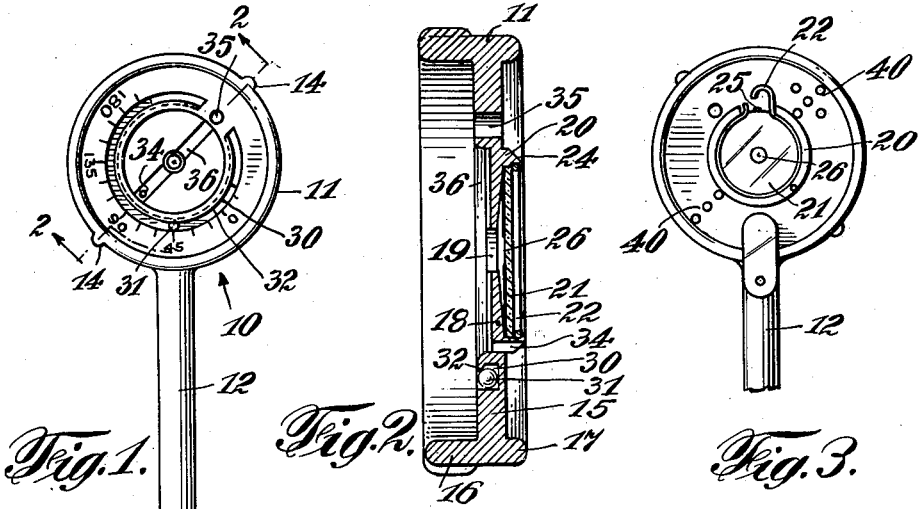
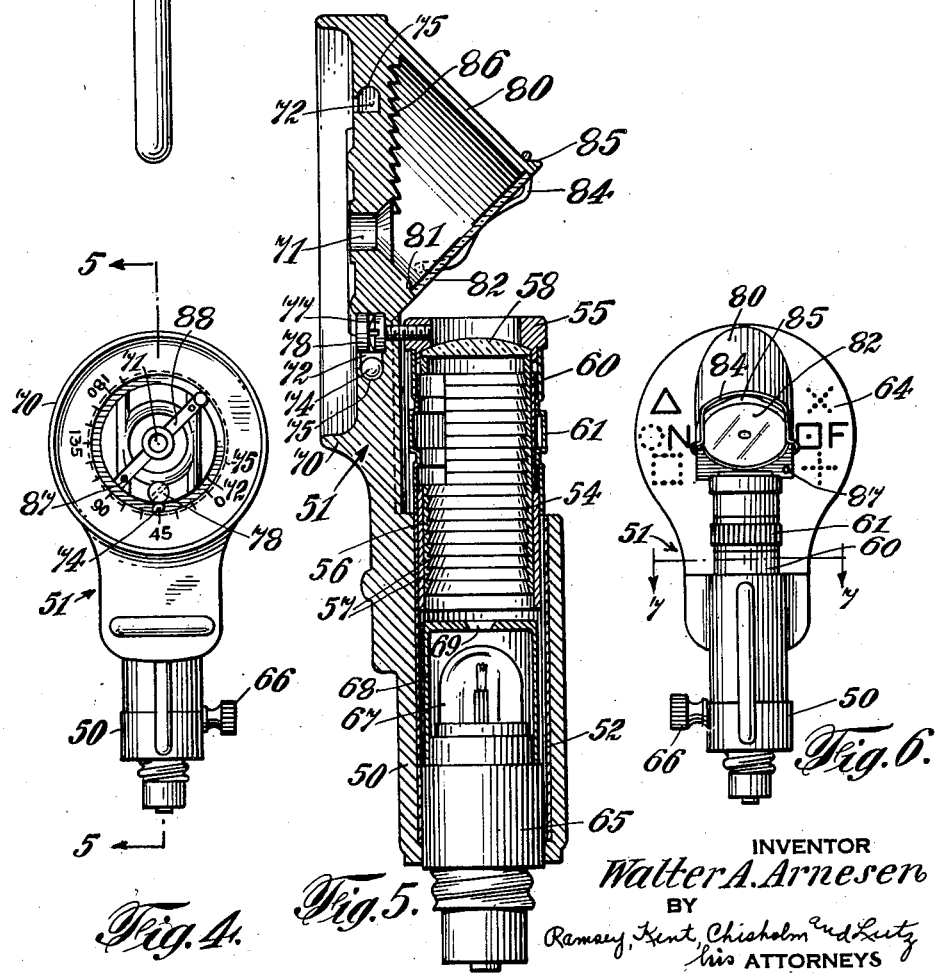
INVENTOR
Walter A. Arnesen
BY
Ramsey, Kent, Chisholm and Lutz
his ATTORNEYS

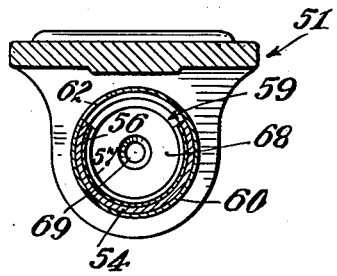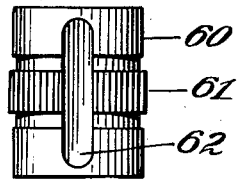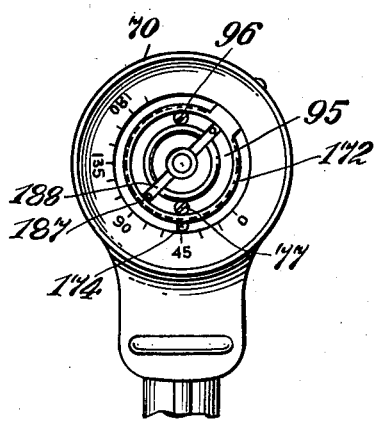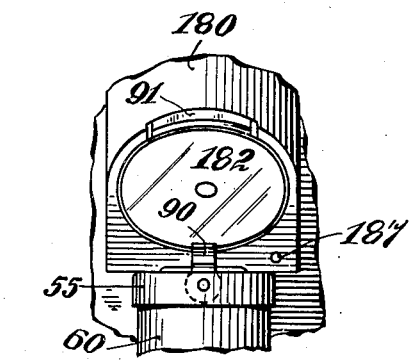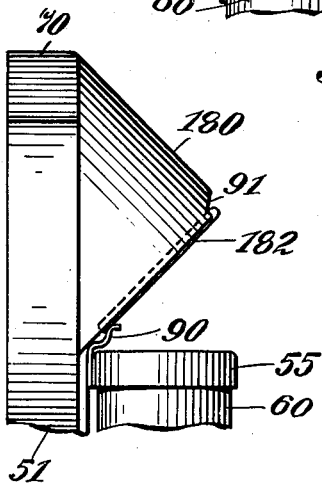

Patented Oct. 12, 1943

2,331,591

UNITED STATES PATENT OFFICE 2,331,591

RETINOSCOPE

Walter A. Arnesen, New York, N. Y., assignor to National Electric Instrument Co. Inc., Long Island City, N. Y., a corporation of New York Application September 14, 1940, Serial No. 356,756

13 Claims. (Cl. 88—20)

This invention relates to improvements in diagnostic instruments and more particularly to improvements in retinoscopes.

An object of the present invention is to provide a new, simple and efficient retinoscope, preferably constructed of moulded material so shaped as to offer the least possible interference with the vision of an operator or examiner.

Another object of the invention is to provide a retinoscope in which the side thereof to be placed adjacent an operator's eye is dished to prevent interference with the operator's vision.

Another object of the invention is to provide a retinoscope incorporating therein means for aiding an operator in quickly determining the angle of the astigmatic shadow band of an eye under examination.

A further object of the invention is to provide a retinoscope having an indication band or stripe to be aligned or oriented with the astigmatic shadow band of an eye under examination, together with means for automatically indicating to an operator the angularity of such band.

Another object of the invention is to provide, in a retinoscope, a mount for a light reflecting member, which mount is so constructed as to permit ready removal of the light reflecting member for cleaning purposes or for substitution purposes.

A further object of the invention is to provide, in a retinoscope having self-contained illumination means therein, formations for eliminating or materially reducing the ill effects attendant upon extraneous or stray light rays.

Other features, objects and advantages of the invention will become apparent by reference to the following detailed description of the accompanying drawings wherein:

Fig. 1 is a front view of an instrument embodying the invention;

Fig. 2 is an enlarged section taken substantially on the line 2—2 of Fig. 1;

Fig. 3 is a fragmentary view of the rear face of such instrument;

Fig. 4 is a front view of a retinoscope having associated therewith illumination means;

Fig. 5 is an enlarged vertical section taken substantially on the line 5—5 of Fig. 4;

Fig. 6 is a rear view of the instrument shown in Fig. 4;

Fig. 7 is a section taken substantially on the line 7—7 of Fig. 6;

Fig. 8 is a side elevation of a rotatable sleeve incorporated in the instrument of Figs. 4 to 6, inclusive;

Fig. 9 is a fragmentary front view of a further modification of the invention;

Fig. 10 is an enlarged rear view of a fragment of the device shown in Fig. 9 illustrating the manner in which a reflecting member can be assembled therewith, and Fig. 11 is an enlarged side elevation of the instrument shown in Fig. 9.

Referring now to the drawings and particularly to Figs. 1 to 3, inclusive, 10 indicates generally a retinoscope incorporating features of the present invention, which retinoscope is of the type employing a light reflecting member for directing light rays from an outside source into the eye under examination. This retinoscope 10 is made up of a head 11 of substantially circular form and a handle 12. The periphery of the head 11 is provided with diametrically oppositely disposed bosses 14 to aid in manipulating the same in a manner to be explained later.

The head 11 is made up of a disc part 15 which has a relatively long boundary flange 16 on one side and a relatively short boundary flange 17 on the other side. The center of the disc 15 is slightly depressed as at 18 and has a through sight aperture 19 therein. One side of the disc 15 has an upstanding bead 20 thereon so shaped as to receive a light reflecting member 21 held in place by a spring member 22 snapped under the inwardly rolled edge 24 of the bead 20. The bead 20 has a cut away part 25 into which the ends of the spring 22 can fit so that these ends can be drawn together to disengage the spring and thereby release the mirror. The mirror 21 can be of glass with a silvered back having an unsilvered spot in the center thereof or can be of polished apertured metal or of any other material. The unsilvered spot 26 of the mirror is coaxial with the sight opening 19 in the disc 15.

Cut into the disc 15 near the depressed part 18 thereof and extending partially around the disc is a groove 30. Graduation characters (shown in Fig. 1) are applied to the surface of the disc adjacent the groove 30. A small ball 31 is retained in the groove 30 by means of an overlapping formation 32 in one wall of the groove.

It is contemplated that the instrument 10 can be moulded integrally of some suitable material and this material may be a thermoplastic composition in order that the formation 32 can be produced. When the material is of a thermoplastic character the groove 30 is made initially with parallel side walls spaced apart an amount sufficient to freely receive the ball 31. After this ball 31 is in place in the groove, the formation 32 can be shaped by application of a suitably shaped hot die which will curl this formation into place retaining the ball in the groove.

Two through openings 34 and 35 are provided in the disc in diametric opposite disposition and are substantially connected by a shallow depression 36 in the disc. This depression 36 may be coated with a white paint or with any other good coating material readily discernible. Diametrically oppositely disposed characters 40 are located on the mirror side of the disc 15, such characters serving as fixation targets or objects.

The operation and use of this device is substantially as follows. An operator in examining a patient's eye holds the retinoscope close to his own eye with the flange side 16 thereof adjacent his eye. This flange 16 can be brought into contact with the operator's face surrounding his own eye with the result that the operator's eye will be held from the surface of the disc part 15 and consequently vision will not be impaired as in the case of an instrument not provided with such flange. Furthermore, this flange can contact with an operator's glasses, if such are worn, and prevent again interference with the operator's vision. Light from some exterior source is directed against the mirror 21 and reflected by that mirror into the patient's eye. The operator can examine the illuminated eye through the sight opening 19 in the disc and through the clear spot 26 in the mirror. This instrument can be used for static retinoscopy or if desired also for dynamic retinoscopy. In the latter case the characters 40 serve as fixation targets or objects upon which the patient concentrates his vision.

If the operator discovers that the eye under examination has astigmatic characteristics the angle of the astigmatic shadow band can readily be determined by the aid of this instrument. The shadow band can be aligned with the groove 36, aligning of the band for orientation purposes being provided by the openings 34 and 35 in addition to the sight opening. The operator can rotate the instrument until the shadow band is oriented with the line determined by groove 36 and when such orientation has been accomplished the freely rolling captive ball 31 indicates on the characters on the disc the angular disposition of the shadow band. The bosses 14 aid an operator in rotating the instrument until orientation has been accomplished. For example, if the shadow band be oriented with the instrument when in the position of Fig. 1, the ball 31 indicates automatically that this shadow band is on an axis of 45°. Since the ball is freely rotatable in the groove 30, though held captive therein, it follows that due to gravity, the ball always will roll freely as the instrument is rotated, automatically designating the relative angle of the groove 36.

In the instrument shown in Figs. 4 to 6, inclusive, the salient features of the present invention have been incorporated in a retinoscope which is provided with self-illumination. This instrument is made up of a hollow handle portion 50 formed integrally with a head part indicated generally at 51. The parts 50 and 51 can be formed integrally of suitable composition materially or of any other desired material and can be moulded by some injection moulding process if desired. In the latter case the handle part 50 has a metallic lining 52 permanently moulded in place during the moulding operation. In addition a tubular metallic member 54 is inserted in the upper end of the lined handle part 50 to extend a considerable distance above this part, such tubular member 54 terminating in an enlarged head part 55.

Secured within the tubular member 54 is a shell 56, the inner surface of which is provided with saw tooth serrations 57. These serrations are provided to reduce or eliminate any harmful effects from extraneous or stray light rays. A condensing lens 58 is confined between the upper end of the shell 56 and the enlarged head part 55 of the member 54.

Both the member 54 and the shell 55 have parts thereof cut away in the space adjacent the head part 51 of the instrument and above the top of the handle 50 as shown clearly at 59 in Fig. 7. Surrounding the part of the member 54 extending above the handle 50 and below the head part 55 is a sleeve 60 which has a knurled central portion 61. The sleeve 60 has a longitudinal slot 62 therein, which, upon rotation, can be moved either from the position shown in Fig. 7 to a similar position at the other extremity of the opening 59. The purpose of this slot 62 is to permit illumination of fixation characters 64 on one surface of the head surface 51.

An electric light bulb socket member 65 is adapted to be introduced into the lower end of the handle 50 and a threaded pin extends from the socket 65 through a suitable slot (not shown) in the handle. A nut 66 threaded on to this pin is utilized to lock the socket in adjusted positions within the handle. An electric light bulb 67 is located in the socket 65 and a cap member 68 can be inserted over the bulb, such cap member having a small opening 69 in the top thereof. This opening, which is used for some diagnostic purposes, reduces the beam of light rays from the lamp 67 and also serves to reduce extraneous or stray light rays.

The head 51 has an annular flange 70 similar to the flange 16 previously described. This head part 51 also has a through opening 71 centrally disposed, and a groove or channel 72 in which a ball 74 is held captive. The channel 72 is made in the surface of the head by first forming the same with parallel side walls and then by undercutting the wall of larger diameter as shown by the dotted line at 75. The smallest width of the groove 72 is sufficient to retain the ball 74 in place, and it is inserted therein in the following manner. The head is provided with a counterbored opening to receive the shank and head of a screw 77 which is threaded into the part 55 of member 54. The counterbored part of this opening is large enough to rupture the rim or wall of smallest diameter of groove 72 so that a ball can be introduced into the groove through the break in the wall. The head of screw 77 is seated below the surface of the head and the disc 78 frictionally fits above this screw head to close the opening in the wall through which the ball was introduced. It is to be understood, however, that the arrangement of Fig. 1 should be utilized if desired, in the stead of this arrangement; or the arrangement of Fig. 9, to be described later, likewise could be used.

The opposite surface of the head 51 is provided with an integral hood formation 80 of substantially tubular shape in cross-section and which extends downwardly terminating in an annular seat 81 to receive a mirror 82. The mirror is similar to that previously described and may be made in the manner before mentioned. This mirror 82 has an uncoated central spot in alignment with the inspection opening 71. The mirror is held in place by a wire clip member or spring 84, the ends of which are bent to fit in suitable openings in the material of the hood 80, and the side expanses of which are bowed to engage edge parts of the mirror as shown in Fig. 6, when the loop part of the spring is snapped behind extending lip 85 of the hood. This spring permits ready installation of a mirror or removal of the same for cleaning or for substitution. The surface of the disc within the hood 80 is serrated as at 86, such serration serving again to reduce or eliminate the ill effects attendant upon extraneous or stray light rays. Such light rays might be reflected into the eye of an operator and materially interfere with diagnosis.

The side of the disc opposite the hood 80 is provided with a through opening 87 and with a groove 88 similar to the groove 36 before described.

In the modification of the invention shown in Figs. 9, 10 and 11, changes are present only in the manner in which a mirror is retained in place and the manner in which a ball is held captive in a groove in the head of the instrument. In the instrument shown in Figs. 10 and 11 the hood 180 again terminates in a seat for a mirror 182 which is held in place by a spring clip member 90 secured between the head part 55 and the material of the head 51 by the screw 77 before described. In this modification, the lip 85 is omitted and instead thereof, the upper edge of the hood is tapered as at 91 to permit a small edge portion of the mirror to be accessible for engagement by an operator's finger nail or by a suitable instrument to withdraw the mirror from confinement by the spring 90. These two arrangements for holding mirrors in place are interchangeable so far as the rest of the instrument are concerned and either thereof can be used.

In Fig. 9 a ball 174 is retained in a groove 172 which is produced by the addition of a separate disc member 95 which is fastened to the surface of the head by the screw 77 before mentioned and by a diametrically opposite screw 96. This disc 95 has its edge undercut to hold the ball captive. A through opening 187 extends both through the disc and through the body of the head in the same manner as the opening 87 and groove 188 is similar to groove 88.

The instruments shown in the two modifications of Figs. 4 to 11, inclusive, can be used in substantially the same manner as that described in connection with the first embodiment of the invention with the exception that light rays for illuminating a patient's eyes are supplied by the bulb 67 instead of being supplied from an outside source. If the examination is to be of a static retinoscopy type, the cap 68 is used in conjunction with the bulb and the examination carried on as before mentioned. However, if the examination is to be of dynamic retinoscopy type, this cap 68 is removed permitting the entire interior of the handle and of the upwardly extending shells to be illuminated and also permitting light rays to be directed through the slot 62 on to the fixation objects on either side of the instrument. In either embodiment of the invention, the captive ball serves to aid an operator in determining the angle of the astigmatic shadow band in the manner before described.

It will be evident from the foregoing that any one of the three arrangements for manufacturing an instrument having a captive ball as part thereof can be utilized and that either arrangement for holding a mirror in place can be used in conjunction with any of these angle determining devices.

It is to be understood that the invention can be modified beyond the illustrated embodiments; in view of which any limitations imposed thereupon are to be only those set forth in the following claims.

What is claimed is:

1. A retinoscope comprising a disc-like head member provided with a central sight aperture, a light bending member secured to one side thereof and held against movement relative to the head, said light bending member having a sight passage aligned with the sight aperture in the head, the opposite side of said head having a predetermined diameter indicated thereon, and means on the said opposite side of said head cooperating with said diameter indications for automatically indicating the relative angularity at which said head is held in a vertical plane by an operator.

2. A retinoscope comprising a disc-like head member provided with a central sight aperture, a light bending member secured to one side thereof and held against movement relative to the head, said light bending member having a sight passage aligned with the sight aperture in the head, the opposite side of said head having a predetermined diameter indicated thereon, and means on the said opposite side of said head cooperating with said diameter indication for automatically indicating the degree to which said head and said light bending member are rotated as a unit while said head is held in a vertical plane.

3. A retinoscope comprising a disc-like head member provided with a central sight aperture, a light bending member on one side thereof, the opposite side of said head having a predetermined diameter indicated thereon, and being provided with a runway, and a free rolling ball captive in said runway for automatically indicating the degree to which the head is rotated while held in a vertical plane.

4. A retinoscope comprising a disc-like head member provided with a central sight aperture, a light bending member on one side of said head, said head member being provided with an aperture radially aligned with said sight aperture, said head being provided with an annular runway, and a ball, captive in said runway cooperating with a line between said apertures for automatically indicating the angularity of said line between the said apertures.

5. A retinoscope comprising a disc-like head member provided with a central sight aperture, a light bending member on one side of said head and having a sight passage aligned with the sight aperture, said head member being provided with an aperture radially aligned with said sight aperture, said head being provided with an annular runway, and a ball, one wall of said runway being undercut to hold said ball captive in said runway, and indicia on said head adjacent said runway, said ball cooperating with said indicia for automatically indicating the angularity of a line between the said apertures.

6. A retinoscope comprising a disc-like head member provided with a central sight aperture, a light bending member on one side of said head and having a sight passage aligned with the sight aperture, said head member being provided with an aperture radially aligned with said sight aperture, said head being provided with an annular runway, a ball, one wall of said runway being undercut to hold said ball captive in said runway, and indicia on said head adjacent said runway, said ball cooperating with said indicia for automatically indicating the angularity of a line between the said apertures, an entry gap in a runway wall for introducing the ball into the runway, and a closure member for said gap.

7. A retinoscope comprising a disc-like head member provided with a central sight aperture, a light bending member on one side of said head and having a sight passage aligned with the sight aperture, said head member being provided with an aperture radially aligned with said sight aperture, said head being provided with an annular runway one wall of which is formed in part by the edge of a removable disc, and a ball, one edge of the runway being undercut to hold the ball captive in said runway, and indicia on said head adjacent said runway, said ball cooperating with said indicia for automatically indicating the angularity of a line between the said apertures.

8. A retinoscope comprising a disc-like head portion having a central sight aperture, said head having a downwardly extending hood on one side thereof formed integrally with the head, the end of said hood being shaped to provide a substantially annular shoulder surrounding a substantially annular seat to receive a light bending member, and a spring for retaining a light bending member removably on said seat.

9. A retinoscope comprising a disc-like head portion having a central sight aperture, said head having a downwardly extending hood on one side thereof formed integrally with the head, the end of said hood being shaped to provide a substantially annular shoulder surrounding a substantially annular seat to receive a light bending member, and a wire spring having its ends spaced apart and extending into said hood for pivotal movement, opposite parts of the spring engaging the light bending member, and a lip on the hood engaged by the spring to lock the light bending member on the seat.

10. A retinoscope comprising a disc-like head portion having a central sight aperture, said head having a downwardly extending hood on one side thereof formed integrally with the head, the end of said hood being shaped to provide a substantially annular shoulder surrounding a substantially annular seat to receive a light bending member, and a spring clip secured to the head at the bottom of the seat for retaining a light bending member removably on said seat.

11. A retinoscope comprising a disc-like head having a central sight aperture, a hood formed integrally therewith on one side thereof and having its end shaped to form a seat for a light bending member extending angularly relative to the plane of the head, a resilient member engaging said light bending member for releasably retaining the same on said seat, a tubular handle part formed integrally with said head to receive a source of light rays, said tubular part being aligned with said seat, the interior of said tubular part and the wall of said head within said hood being serrated.

12. A retinoscope comprising a handle portion, a disc-like head portion formed integrally with the handle portion, said head portion being provided with a substantially central sight aperture and being provided on one side thereof with an integral outwardly extending portion of diameter considerably smaller than the diameter of the head portion, said outwardly extending portion terminating in a substantially annular shoulder surrounding a substantially annular seat for receiving a mirror having a sight passage, and a resilient member engaging said mirror for releasably retaining the same on said seat within said shoulder.

13. A retinoscope comprising a disc-like head member of molded composition material provided with a central sight aperture, a light bending member on one side of said head and having a sight passage aligned with the sight aperture, said head member being provided with an aperture radially aligned with the sight aperture, said head being provided with an annular runway, and a ball member, one wall of said runway having an integral formation shaped to reduce the width of the runway mouth and thereby to hold the ball captive in said runway, and indicia on said head adjacent said runway, said ball cooperating with said indicia and a line between said apertures for automatically indicating the angularity of said line between the apertures.

WALTER A. ARNESEN.